(12) United States Patent
Hirsch et al.

(10) Patent No.: US 8,726,749 B2
(45) Date of Patent: May 20, 2014

(54) TRANSMISSION OVERDRIVE YOKE POSITION SENSOR FOR RANGE TRIGGER

(75) Inventors: Mark A. Hirsch, Vicksburg, MI (US);
Paul J. Mason, Battle Creek, MI (US);
Robert B. Craft, Ceresco, MI (US)

(73) Assignee: Eaton Corporation, Cleveland, OH (US)

( * ) Notice: Subject to any disclaimer, the term of this patent is extended or adjusted under 35 U.S.C. 154(b) by 84 days.

(21) Appl. No.: 13/244,597

(22) Filed: Sep. 25, 2011

(65) Prior Publication Data
US 2013/0075224 A1  Mar. 28, 2013

(51) Int. Cl.
*F16H 59/04*  (2006.01)
*F16H 63/32*  (2006.01)

(52) U.S. Cl.
USPC .............. 74/335; 74/473.36; 74/473.37

(58) Field of Classification Search
USPC .................. 74/335, 473.36, 473.37
See application file for complete search history.

(56) References Cited

U.S. PATENT DOCUMENTS

| | | | |
|---|---|---|---|
| 4,222,281 A * | 9/1980 | Mylenek | 74/339 |
| 4,621,537 A * | 11/1986 | Piazza et al. | 74/473.24 |
| 4,676,115 A | 6/1987 | Morscheck et al. | |
| 4,757,726 A * | 7/1988 | Yamaguchi et al. | 74/473.1 |
| 4,920,815 A * | 5/1990 | Reynolds | 74/335 |
| 4,944,197 A * | 7/1990 | Stine et al. | 74/473.26 |
| 4,974,474 A * | 12/1990 | Newbigging | 477/122 |
| 5,031,472 A | 7/1991 | Dutson et al. | |
| 5,179,869 A | 1/1993 | Reynolds | |
| 5,193,410 A | 3/1993 | Stine et al. | |
| 5,216,931 A | 6/1993 | Hirsch et al. | |
| 5,363,715 A | 11/1994 | Huggins et al. | |
| 5,899,121 A | 5/1999 | Mulvihill et al. | |
| 6,019,011 A | 2/2000 | Monette et al. | |
| 2005/0066755 A1 | 3/2005 | Hughes et al. | |
| 2005/0172747 A1 | 8/2005 | Heathcote et al. | |
| 2008/0236322 A1 | 10/2008 | Jeng et al. | |

FOREIGN PATENT DOCUMENTS

| | | |
|---|---|---|
| DE | 102008050773 A1 | 3/2010 |
| DE | 102008059696 A1 | 6/2010 |
| EP | 1637779 A1 | 3/2006 |
| FR | 2924777 A1 | 6/2009 |
| JP | 11210877 | 3/1999 |

OTHER PUBLICATIONS

English abstract for JP-11210877.
English abstract for FR-2924777.
English abstract for de-102008059696.
English abstract for EP-1637779.
International Search Report for PCT/IB2012/001863.

* cited by examiner

*Primary Examiner* — Ha D Ho
(74) *Attorney, Agent, or Firm* — Rader, Fishman & Grauer PLLC

(57) ABSTRACT

Disclosed is an exemplary transmission clutch fork position sensor including an elongated bar and a clutch fork slidably engaging the elongated bar. A yoke bar includes a first end coupled to the clutch fork for concurrent movement therewith. A position sensor operably engages the yoke bar, and is operable for detecting a position of the yoke bar.

17 Claims, 7 Drawing Sheets

TRANSMISSION OVERDRIVE YOKE POSITION SENSOR FOR RANGE TRIGGER

BACKGROUND

Compound transmissions of the range or combined range/splitter type are typically employed with heavy-duty vehicles, such as transport trucks. Transmissions of this type generally include a multiple speed main transmission section connected in series with a range type auxiliary section, wherein the range step of the auxiliary section is greater than the total ratio coverage of the main transmission section. The main transmission section may be shifted directly or remotely by a manual shift lever. The auxiliary section may be shifted by a slave actuator and is pneumatically, hydraulically, mechanically and/or electrically operated in response to manual operation of one or more switches. The range section may utilize synchronized jaw clutches. A range shift should be initiated and completed while the main transmission section is in neutral, to provide acceptable shift quality and to prevent undue wear and/or damage to the synchronized jaw clutches.

Compound range type transmissions typically include a control system that allows a range shift to be preselected using a selector button or switch at a master control valve. To prevent damage to the jaw clutches, the control system prohibits shift initiation until the main transmission section is shifted to, or at least towards, the neutral condition. One method for preventing shift initiation utilizes mechanical type interlock devices on the range section actuator mechanical linkage that physically prevents movement of the range section shift fork until the main section is shifted into neutral. A second system for preventing shift initiation utilizes logic-based interlock devices of the type wherein a valve supplying pressurized fluid to the range section cylinder is either disabled or not provided with pressurized fluid until a shift to main section neutral is sensed, or is only activated and provided with pressurized fluid while the main section is shifted to and remains in neutral. Examples of such transmissions and their control systems may be seen by reference to U.S. Pat. Nos. 2,654,268; 3,138,965, 4,060,005 and 4,974,474, the disclosures of which are hereby incorporated by reference.

Consistent and reliable operation of compound range type transmissions generally requires the ability to accurately detect the neutral condition of the transmission. Options for detecting the neutral condition of the transmission may include transmission shift bar housing neutral sensing devices comprising a plurality of separate sensing devices or switches for sensing axial displacement of each of a plurality of separate shift rails from an axially non-displaced neutral position. Illustrative examples of such mechanisms are disclosed in U.S. Pat. Nos. 4,722,237 and 4,445,393, which are hereby incorporated by reference. Other options include transmission shift bar housing neutral sensing devices comprising an axially displaceable rod having a plurality of specially contoured ramps and grooves (often referred to as a "Christmas tree" rod) arranged transverse to the longitudinal axes of the shift rails and cooperating with corresponding grooves/ramps formed in the shift rails. Illustrative examples of such mechanisms are disclosed in U.S. Pat. Nos. 4,676,115 and 4,290,515, which are hereby incorporated by reference.

The position of the transmission shift rails may not, in all instances, provide the most accurate indication of the actual neutral condition of the transmission. For example, certain compound range type transmissions, such as those including an overdrive gear range, may employ an X-control type mechanism to maintain a shift stick or shift lever pattern as a conventional progressive "H" type pattern for the forward speed ranges, including overdrive. The X-control mechanism operates to reverse the internal shift fork movement for the final speed changes to enable the overdrive speed range to be selected in the final position of the shift stick or lever. This is generally accomplished by employing a pivoted lever or "flipper" between the shift rail for actuating overdrive and the corresponding shift fork to reverse the action of the shift stick on the movement of the shift fork and cause the shift fork to engage the overdrive ratio in the final position of the shift stick. The pivoted lever or "flipper" causes the overdrive shift fork and the overdrive shift rail to move in opposite directions. Manufacturing tolerances and normally occurring wear of the X-control mechanism over the life of the transmission, however, may degrade the accuracy of using the position of the overdrive shift rail as an indication of the actual neutral condition of the overdrive shift fork, which may adversely effect operation of the range shift mechanism.

DETAILED DESCRIPTION

Figure 1:
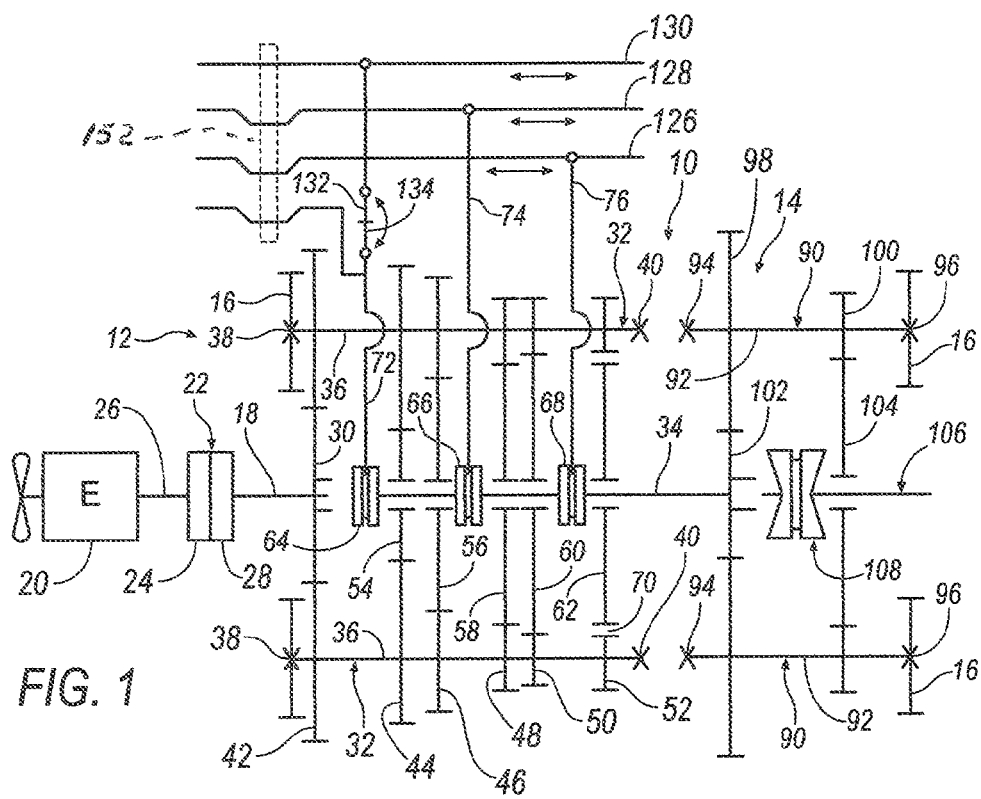
FIG. 1 is schematic illustration of an exemplary compound transmission having a range type auxiliary section and employing an exemplary transmission neutral sensing device.

Referring now to the discussion that follows and the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive, otherwise limit, or restrict the claims to the precise forms and configurations shown in the drawings and disclosed in the following detailed description.

Figure 2:
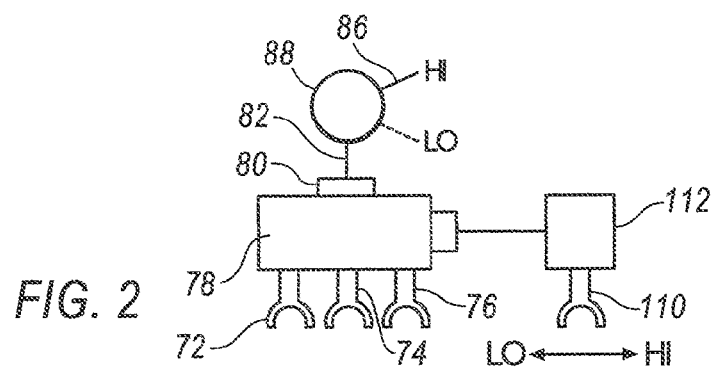
FIG. 2 is a schematic illustration of a shifting mechanism of the transmission of FIG. 1.
Figure 3:
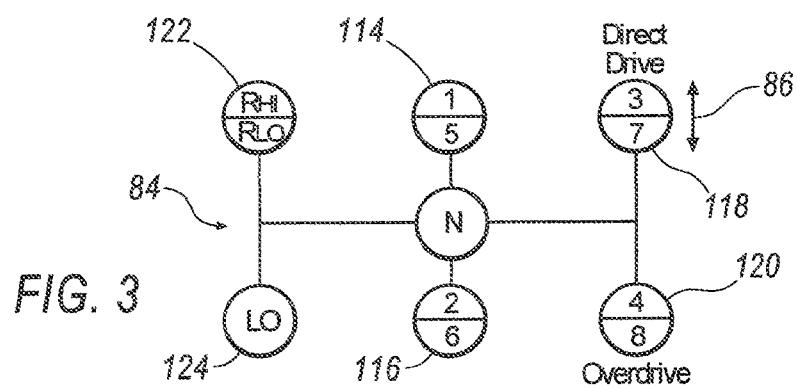
FIG. 3 is a schematic illustration of a "repeat H" type shift pattern of the transmission of FIG. 1.

Referring to FIGS. 1-3, an exemplary range type compound transmission 10 includes a multiple speed main transmission section 12 connected in series with a range type auxiliary section 14. The term "compound transmission" refers generally to a change speed or change gear transmission having a multiple forward speed main transmission section and a multiple speed auxiliary transmission section connected in series, where the selected gear reduction in the main transmission section may be compounded by a further selected gear reduction in the auxiliary transmission section. Transmission 10 is received within a housing 16 and includes an input shaft 18 driven by a prime mover such as an internal combustion engine 20 (e.g., a diesel engine), through a selectively disengagable master clutch 22 having an input or driving portion 24 rotatably connected to a crankshaft 26 of engine 20 and a driven portion 28 rotatably fixed to a transmission input shaft 18.

Transmission input shaft 18 carries a transmission input gear 30 for driving a pair of countershaft assemblies 32 at substantially the same rotational speed. The two countershaft assemblies 32 may be arranged on diametrically opposite sides of a transmission main shaft 34, which is generally coaxially aligned with transmission input shaft 18. Each of the countershaft assemblies 32 comprises a countershaft 36 supported by bearings 38 and 40 in housing 16. Each of the countershafts 36 includes a set of countershaft gears 42, 44, 46, 48, 50 and 52, fixed for rotation therewith. A plurality of mainshaft gears 54, 56, 58, 60, 62 surround the mainshaft 34 and are selectively clutchable, one at a time, to the mainshaft 34 for rotation therewith by sliding clutch collars 64, 66 and 66 in a direction generally parallel to a rotational axis of mainshaft 34. Mainshaft gear 62 is a reverse gear and is in continuous meshing engagement with countershaft gear 52 by means of an intermediate idler gear 70.

Clutch collars 64, 66 and 68 are typically axially positioned by means of shift forks 96, 98 and 100, respectively. Clutch collars 64, 66 and 68 may be of the synchronized or non-synchronized double acting jaw clutch type. Clutch collars 64, 66, and 68 are three-position clutches that they may be positioned in a centered non-engaged neutral position, for example, as illustrated in FIG. 1, in a forward engaged position or in a rearward engaged position, by means of shift forks 96, 98, and 100, respectively. Clutch collars 64, 66 and 68 do not provide any coupling action when arranged in the centered non-engaged neutral position. The terms "neutral", "not engaged", "non-engaged", and the like, are used interchangeably, and refer to a main transmission section condition in which torque is not transferred from transmission input shaft 18 to mainshaft 34. The terms "not neutral", "non-neutral", "engaged", and the like, are used interchangeably, and refer to a main transmission section condition where a main section drive ratio is engaged and drive torque is transferred from transmission input shaft 18 to the main shaft 34.

Shift forks 72, 74 and 76 may be integrated into a shift rail housing assembly 78. The shift forks 72, 74 and 76 extend from the shift rail housing assembly 78, to engage clutch collars 64, 66 and 68, and are controlled by a selector mechanism 80 operably associated with shift rail housing 78. Selector mechanism 80 in turn is controlled by operator manipulation of a transmission input device, or shift lever 82. Only one of the clutch collars 64, 66 and 68 is engagable at a given time. A vehicle operator manipulates shift lever 82 to shift main section 12. The resulting shift pattern 84 illustrated in FIG. 3 is known as a "repeat H" pattern. The operator may also manipulate a range switch 86 to selectively shift range section 14 between a high range and a low range. Range shifting is only permitted when main section 12 is in neutral. Range switch 86 may be mounted at a location within the vehicle convenient to the operator, and is typically mounted on a knob 88 of shift lever 82.

While exemplary main transmission section 12 is described as having five selectable forward speed ratios, the lowest forward speed ratio, namely that provided by drivingly connecting mainshaft drive gear 60 to mainshaft 34, is typically a high gear reduction corresponding to a low or "creeper" gear that is generally utilized only for starting a vehicle under severe conditions, and is not usually utilized in a high transmission range. Accordingly, while main transmission section 12 does provide five forward speeds, it is usually referred to as a "four plus one" or "(4+1)" main section, as only four of the forward speeds are compounded by the auxiliary range transmission section 14.

With continued reference to FIG. 1, range section 14 includes two range countershaft assemblies 90, each comprising a range countershaft 92 supported by bearings 94 and 96 in housing 16 and carrying two range countershaft gears 98 and 100 for rotation therewith. Auxiliary countershaft gears 98 are constantly meshed with a range input/main section output gear 102 that is fixed for concurrent rotation with mainshaft 34. Auxiliary section countershaft gears 100 are constantly meshed with an auxiliary section output gear 104 that surrounds a transmission output shaft 106.

With continued reference to FIGS. 1 and 2, range section 14 further includes a synchronized two-position range jaw clutch assembly 108. A synchronized jaw clutch may include any positive, jaw-type clutch assembly utilized to non-rotatably couple a selected gear to a shaft by means of a positive clutch in which attempted engagement of the clutch is prevented until the members of the clutch are at substantially synchronous rotation. Relatively large capacity friction means are typically employed with the clutch members and are sufficient, upon initiation of a clutch engagement, to cause the clutch members and all members rotating therewith to rotate at substantially synchronous speed. Jaw clutch assembly 108 is axially positioned by means of a range shift fork 110. Jaw clutch assembly 108 is rotatably fixed to transmission output shaft 106 for concurrent rotation therewith. A range section shifting actuator assembly 112 (also known as a range actuator), is provided for clutching either auxiliary section output gear 104 to transmission output shaft 106 for low range operation, or range input/main section output gear 102 and mainshaft 34 to transmission output shaft 106 for direct or high range operation of the compound transmission 10.

With reference to FIGS. 1-3, the shifting of gears in the main section 12 will be described in greater detail. Clutch collars 64, 66 and 68 are typically axially positioned by means of shift forks 72, 74 and 76, respectively. Clutch collars 64, 66 and 68 may be of the synchronized or non-synchronized double acting jaw clutch type. Clutch collars 64, 66, and 68 are three-position clutches that may be positioned in a centered non-engaged neutral position, such as illustrated in FIG. 1, in a forward engaged position or in a rearward engaged position, by means of shift forks 72, 74 and 76, respectively. Clutch collars 64, 66 and 68 do not provide any coupling action when arranged in the centered non-engaged neutral position. The terms "neutral", "not engaged", "non-engaged", and the like, are used interchangeably, and refer to a main transmission section condition in which torque is not transferred from transmission input shaft 18 to mainshaft 34. The terms "not neutral", "non-neutral", "engaged", and the like, are used interchangeably, and refer to a main transmission section condition where a main section drive ratio is engaged and drive torque is transferred from transmission input shaft 18 to the main shaft 34. The terms "forward" and "rearward" refer respectively to the front and rear ends of the transmission as conventionally mounted in a vehicle, being respectively from left and right sides of the transmission, as illustrated in FIG. 1.

With continued reference to FIGS. 1-3, a $1^{st}/5^{th}$ speed range may be selected by moving shift lever 82 to position 114 corresponding to the 1/5 speed position in FIG. 3, which results in rearward movement of the shift fork 74 and clutch collar 66 to engage mainshaft gear 58 with transmission mainshaft 34. The terms "forward" and "rearward" refer respectively to the front and rear ends of the transmission as conventionally mounted in a vehicle, being respectively from left and right sides of the transmission, as illustrated in FIG. 1. A $2^{nd}/16^{th}$ speed range may be selected by moving shift lever 82 to position 116 corresponding to the 2/6 speed position in FIG. 3, thereby causing forward movement of shift fork 74 and clutch collar 66 to engage mainshaft gear 56 with transmission mainshaft 34.

A $3^{rd}/7^{th}$ speed range, corresponding to a direct drive speed range in exemplary compound transmission 10, may be selected by moving shift lever 82 to position 118 corresponding to the 3/7 speed position in FIG. 3. This results in forward movement of shift fork 72 and clutch collar 64 to directly couple transmission input shaft 18 to mainshaft 34.

In the exemplary configuration of compound transmission 10 illustrated in FIG. 1, countershaft gear 44 meshes continuously with mainshaft gear 54 to produce an overdrive speed ratio corresponding to a $4^{th}/8^{th}$ speed range. The overdrive speed range (i.e., $4^{th}/8^{th}$ speed range) may be selected by moving shift lever 82 to position 120 corresponding to the 4/8 speed position in FIG. 3. This results in reward movement of shift fork 72 and clutch collar 64 to engage mainshaft gear 54 with transmission mainshaft 34. Forward and rearward movement of shift fork 96 is accomplished by employing an X-control type mechanism arranged within shift rail housing 78, as described in more detail below.

Reverse is selected by moving clutch fork 76 and clutch collar 68 rearward to rotatably engage reverse mainshaft gear 62 with mainshaft 34. This may be accomplished by moving shift lever 82 to a reverse position 122, as indicated in FIG. 3. A low speed range, typically corresponding to a "creeper gear", may be selected by moving shift lever 82 to a "LO" position 124 in FIG. 3, thereby moving clutch fork 76 and clutch collar 68 forward to rotatably couple mainshaft gear 60 to mainshaft 34.

The overall transmission ratio between the speed of rotation of transmission input shaft 18 and transmission output shaft 106 is determined by a combination of the gear selected in main section 12 and the gear selected in range section 14. The H-shaped shift pattern defined positions 114 through 120 of shift pattern 84 provide gears 1-4 when range section 14 is arranged in a Low configuration (i.e., range jaw clutch assembly 108 is positioned in a rearward position to rotatably couple auxiliary section output gear 104 to transmission output shaft 106), and gears 5-8 when range section 14 is arranged in a HI configuration (i.e., range jaw clutch assembly 108 is positioned in a forward position to rotatably couple range input/main section output gear 102 to transmission output shaft 106). Repeating the shift pattern with the range section 14 in HI and then in LO provides the full complement of speed ratios 1-8, as indicated by positions 114 through 123 in FIG. 3.

Figure 4:
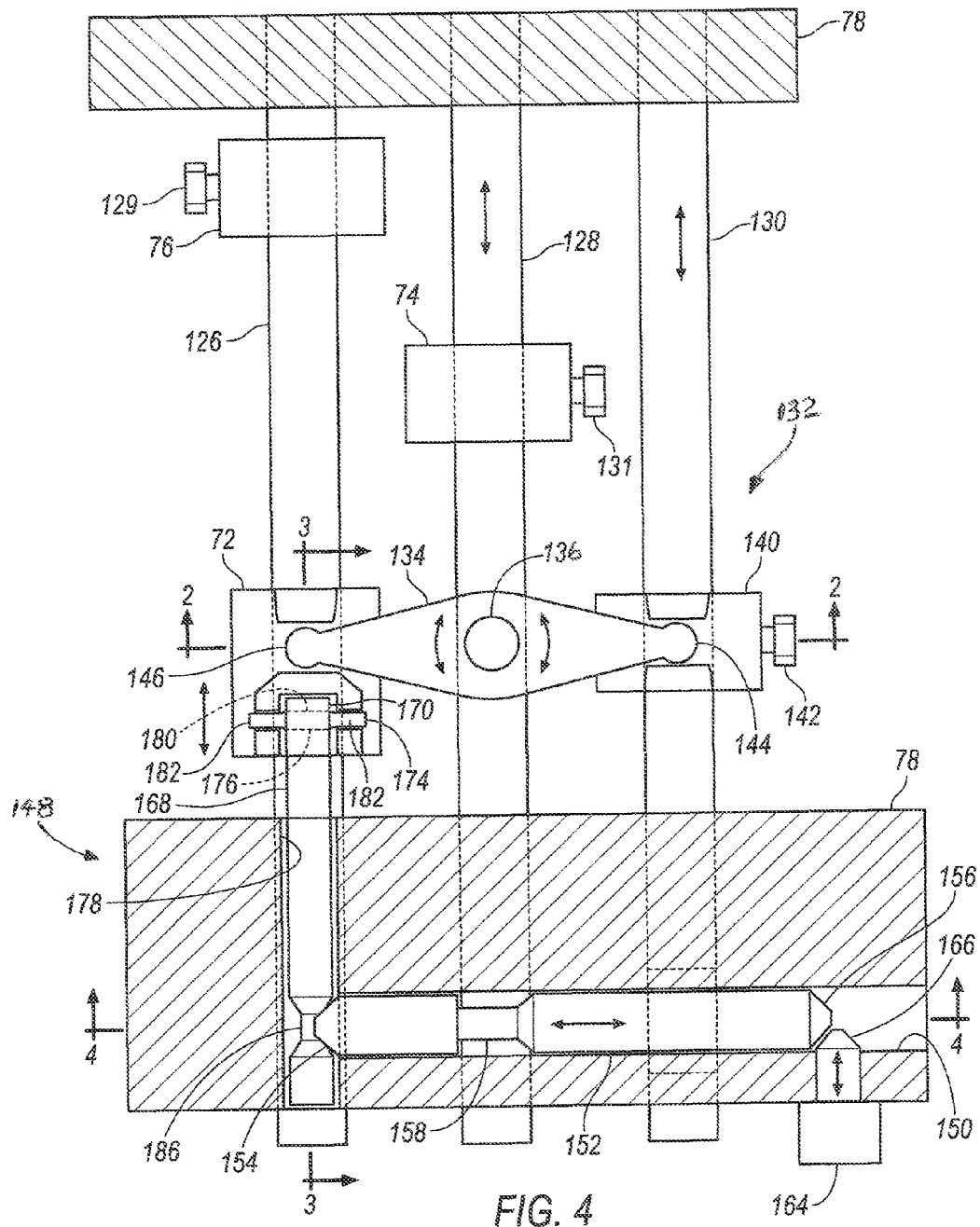
FIG. 4 is a schematic illustration of the exemplary transmission neutral sensing device employed with the transmission of FIG. 1.
Figure 5:
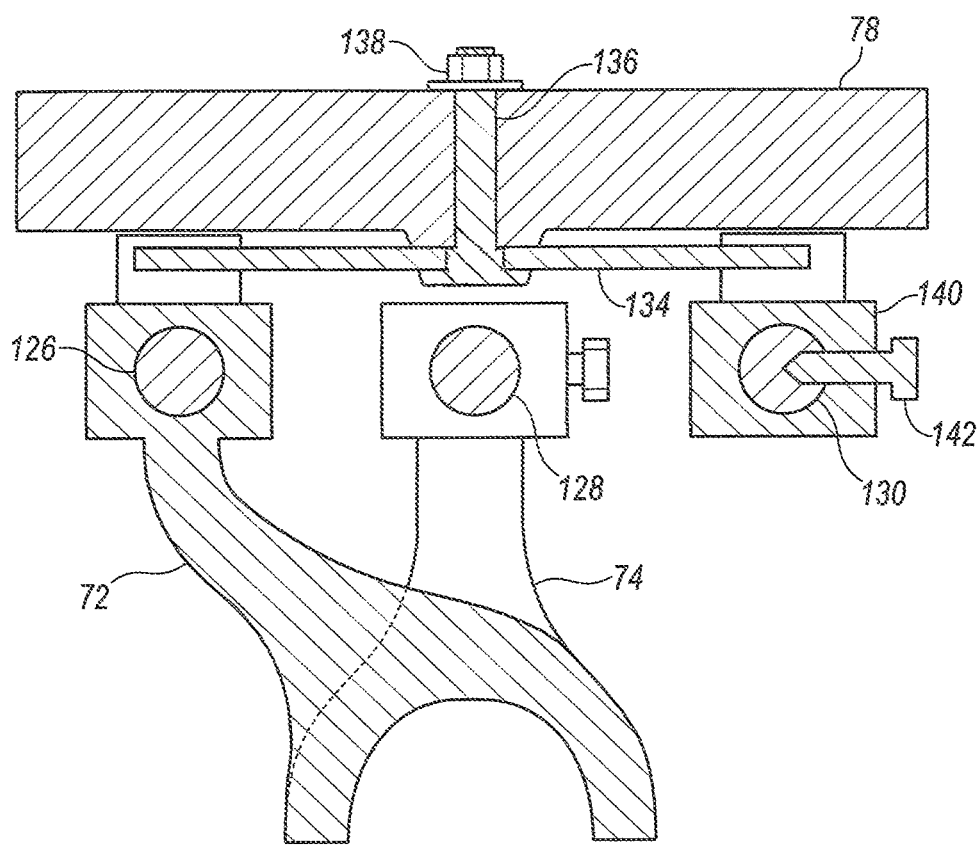
FIG. 5 is a schematic illustration of an X-control type mechanism for reversing the action of a shift stick on the movement of a shift fork employed with the transmission of FIG. 1.

Main transmission section 12 may include at least one shift rail or shift shaft arranged within shift rail housing 78 and controlled by operation of shift lever 82. With reference to FIGS. 1 and 4, shift forks 72 and 76 are supported by a shift rail 126, and shift fork 74 is supported by shift rail 128. Shift forks 76 and 74 may be fixedly attached to shift rails 126 and 128, respectively, for concurrent movement therewith, for example, by screw 129 and 131. Shift fork 72 is configured to slidably engage shift rail 114. A third shift rail 130 is provided for actuating shift fork 72 by means of an X-control mechanism 132. Shift rails 126, 128 and 130 are movable by an operator in opposite directions along their respective longitudinal axis. Movement of shift rails 126, 128 and 130 occur in response to operator manipulation of shift lever 82 in connection with performing a gear range shifting sequence.

Compound transmission 10 utilizes X-control mechanism 132 to maintain the shift lever pattern as a conventional progressive "H" type pattern, as illustrated in FIG. 3, for the forward speed ranges, including overdrive (i.e., position 120 in FIG. 3). X-control mechanism 132 operates to reverse the internal movement of shift fork 72 for the final speed change to enable the overdrive speed range to be selected in the final position of shift lever 82 (i.e., position 120 in FIG. 3). This is accomplished by employing a pivot arm 134 or "flipper" disposed between shift rail 130 and shift fork 72 for actuating the direct drive gear range (i.e., moving clutch collar 64 forward to rotatably couple transmission input shaft 18 to mainshaft 34) and the overdrive gear range (i.e., moving clutch collar 64 reward to rotatably couple mainshaft gear 54 to mainshaft 34). Pivot arm 134 operates to reverse the action of shift lever 82 on the movement of shift fork 72 and cause shift fork 72 to move clutch collar 64 rearward, rather than forward, to rotatably couple mainshaft gear 54 (overdrive gear) to mainshaft 34 when shift lever 82 is arrange in the final position 120, as illustrated in FIG. 3. Pivot arm 134 causes shift fork 72 and shift rail 130 to move in opposite directions.

Pivot arm 130 may be pivotably attached to shift rail housing 78 by means of a pivot pin 136, which may be secured to shift rail housing 78 by a nut 138. Other types of fasteners may also be employed, including but not limited to, screws, pins and rivets.

X-control mechanism 132 includes a control block 140 that may be fixedly attached to shift rail 130 by means of a fastener 142, which may include, for example, a bolt, screw, pin, and rivet, as well as other types of fasteners. Control block 140 can be selectively moved in opposite axial directions through longitudinal (axial) movement of shift rail 130 by manipulating shift lever 82. Control block 140 is connected to a first end 144 of a pivot arm 134. An opposite second end 146 of pivot arm 134 engages shift fork 72, which is slidably movable along shift rail 126.

Figure 6:
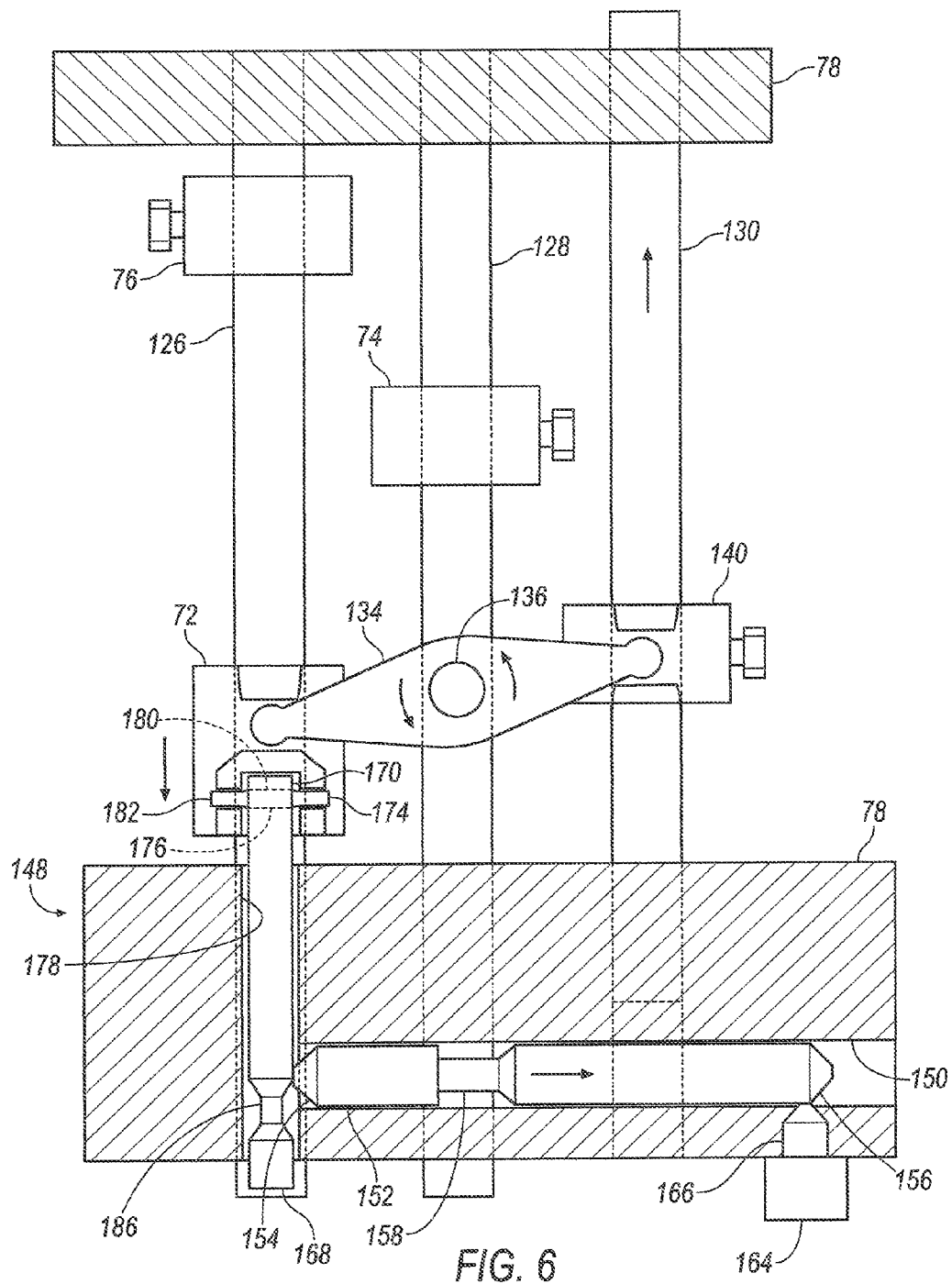
FIG. 6 is a schematic illustration of the exemplary transmission neutral sensing device of FIG. 4 arranged in a first non-neutral position.
Figure 7:
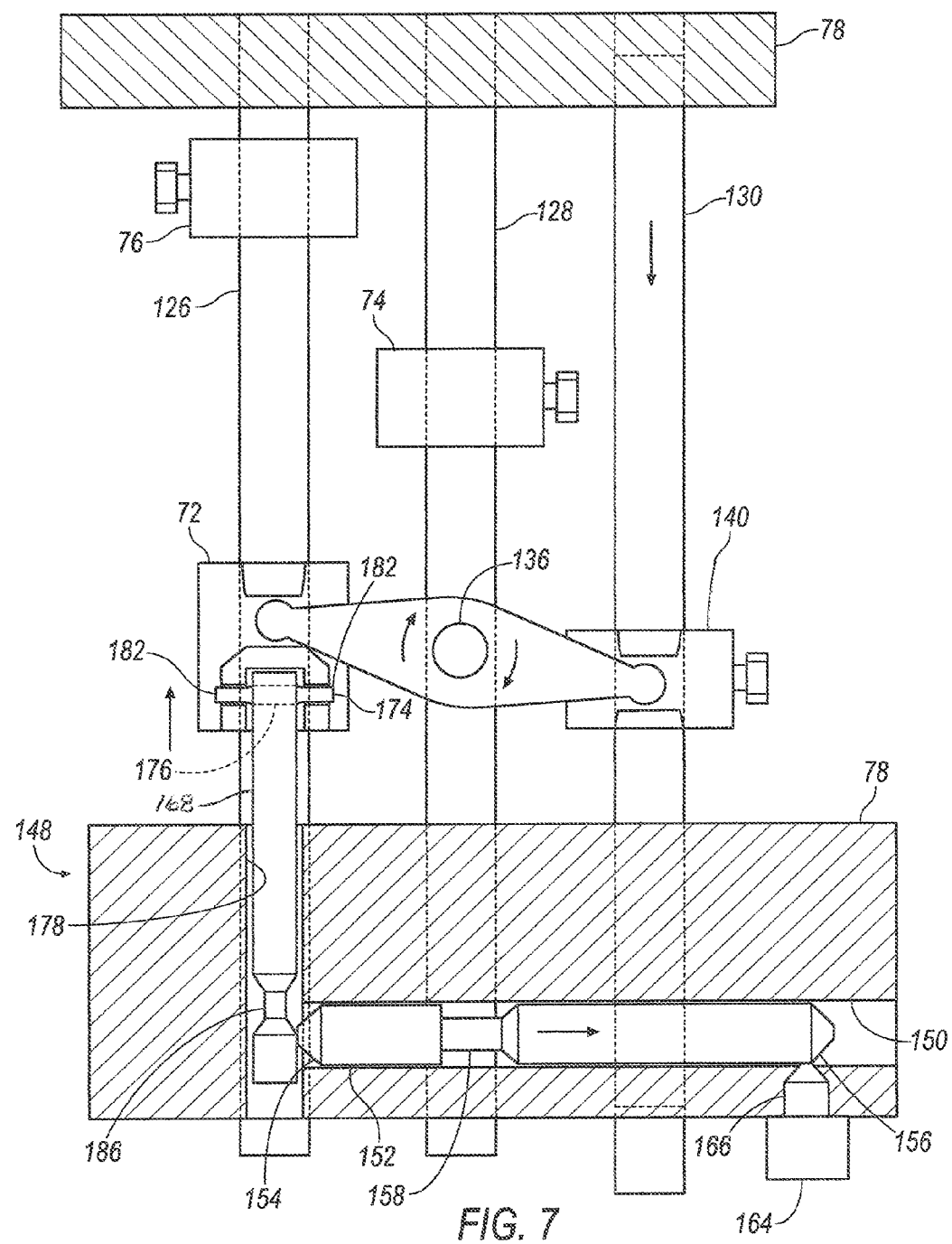
FIG. 7 is a schematic illustration of the exemplary transmission neutral sensing device of FIG. 4 arranged in a second non-neutral position.

With reference to FIGS. 6 and 7, movement of control block 140 by shift rail 130 in a first axial direction, as shown for example in FIG. 6, causes pivot arm 134 to pivot about pivot pin 136 and slide shift fork 72 in an opposite axial direction along shift rail 126 for effecting engagement of a selected mainshaft gear to the mainshaft 34. Similarly, movement of control block 149 by shift rail 130 in a second axial direction opposite to the first axial direction, as for example in FIG. 7, causes pivot arm 134 to pivot about pivot pin 136 and slide shift fork 72 in an opposite axial direction along shift rail 126 for effecting engagement of a different mainshaft gear to mainshaft 34.

Figure 8:
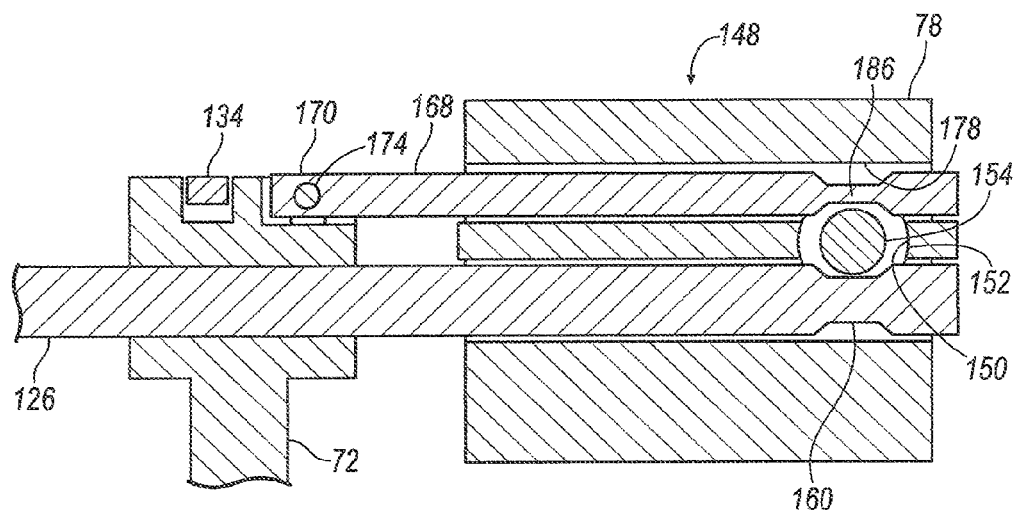
FIG. 8 is schematic illustration of a yoke bar employed with the exemplary transmission neutral sensing device.
Figure 9:
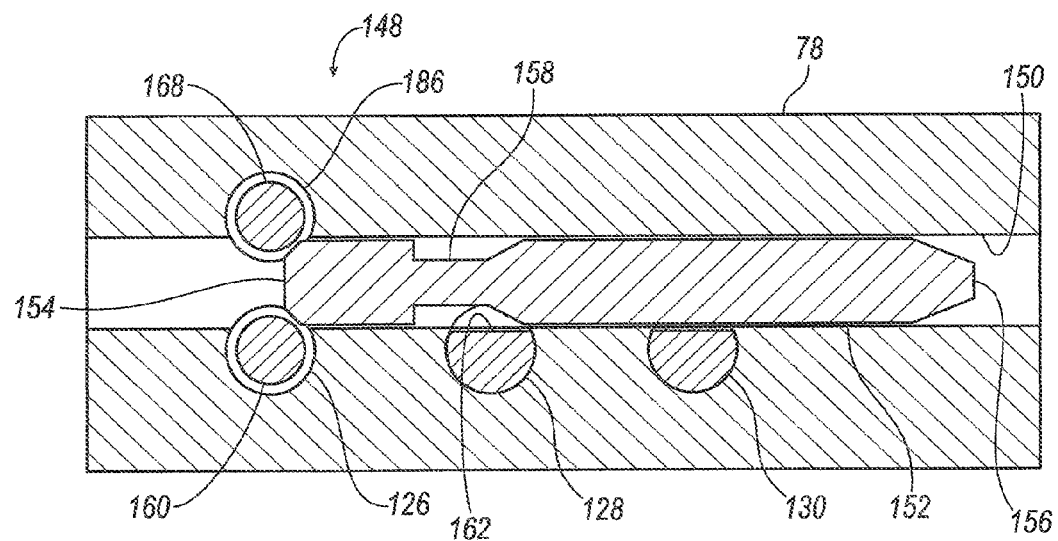
FIG. 9 is a schematic illustration of a yoke bar employed with the exemplary transmission neutral sensing device.
Figure 10:
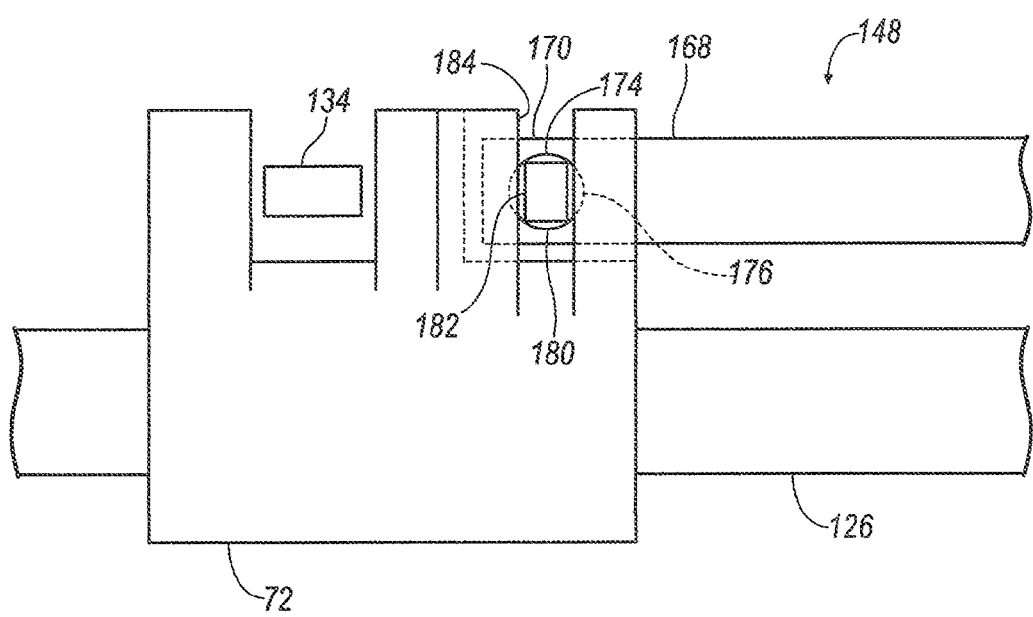
FIG. 10 is a schematic illustration of a connection between the yoke bar of the exemplary transmission neutral sensing device and a clutch fork of the transmission of FIG. 1.

Referring to FIGS. 4, 8 and 9, compound transmission 10 may include a transmission neutral sensing assembly 148 for detecting a neutral condition of the transmission. Neutral sensing assembly 148 detects the neutral condition of compound transmission 10 by monitoring an axial position of shift rails 126 and 128, and shift fork 72. Neutral sensing assembly 148 is operable to provide a neutral signal indicating that shift rails 126 and 128, and shift fork 72, are in the neutral position. The neutral signal may be used for controlling shifting of auxiliary section 14.

Neutral sensing assembly 148 includes a neutral sensor bore 150 extending generally transverse to a longitudinal axis of shift rails 126 and 128 through shift rail housing 78. Slidably disposed within neutral sensor bore 150 is a neutral sensing plunger 152 having a notched first end 154 and a second notched end 156. Neutral sensing plunger 152 includes a necked down or intermediate notched region 158 located between the first and second notched ends 154 and 156 of neutral sensing plunger 152.

Shift rail 126 includes a notched region 160, as illustrated in FIG. 8, which cooperatively interacts with first notched end 154 of neutral sensing plunger 152. Shift rail 128 includes a notched region 162, as illustrated in FIG. 9, which cooperatively interacts with intermediate notched region 158 of neutral sensing plunder 152. Neutral sensing plunger 152 detects a neutral condition of shift rails 126 and 128 by monitoring a location of notched regions 160 and 162 in the respective shift rails.

Each of the notched regions 160 and 162 in shift rails 126 and 128, respectively, will substantially coaxially align with neutral sensor bore 150 when the shift rail associated with the respective notch is in its neutral or axially non-displaced position. With both shift rails 126 and 128 arranged in a neutral position, neutral sensing plunger 152 is biased to a neutral indicating position, as illustrated in FIG. 4. Neutral sensing plunger 152 will be displaced axially within neutral sensing bore 150 (to the right in the drawing figures) into a non-neutral indicating position, as illustrated in FIGS. 6 and 7, whenever any one of the shift rails 126 and 128 is axially displaced from its neutral position. Neutral sensing plunger 152 is biased axially toward the neutral indicating position shown in FIG. 4 (toward the left in the drawing figures).

Neutral sensing assembly 148 may include a neutral sensor 164 having a plunger 166 that operably cooperates with second notched end 156 of neutral sensing plunger 152. Neutral sensor 164 operates to detect a position of neutral sensing plunger 152 and provide a signal indicative of the neutral condition of main transmission section 12.

Prior neutral detection methods for monitoring a position of an overdrive transmission employing an X-control mechanism for actuating an overdrive shift fork typically involved monitoring a position of the shift rail used to actuate the overdrive shift fork. Due to manufacturing tolerance stack occurring between the shift rail and the overdrive shift fork, which typically increases over the life of the transmission due to normal wear, monitoring a position of the shift rail may not provide the most accurate indication of an actual position of the overdrive shift fork. To overcome this potential deficiency, neutral sensing assembly 148 employs a mechanism for directly sensing a position of clutch fork 72 (used to select the overdrive gear range), rather monitoring a position of shift bar 130 used to actuate clutch fork 72.

With reference to FIGS. 4-10, neutral sensing assembly 148 includes a yoke bar 168 having a first end 170 attached to shift fork 72 for concurrent movement therewith, and a second end 172 that cooperatively interacts with first notched end 154 of neutral sensing plunger 154. Yoke bar 168 may be pivotally attached to clutch fork 72 by means of a yoke pin 174 that extends through a through an aperture 176 in yoke bar 168. Yoke pin 174 slidably engages aperture 176. Yoke bar 168 slidably engages a yoke bar bore 178 extending generally parallel to shift rail 126 through shift rail housing 78. Yoke bar bore 178 intersects neutral sensor bore 150.

Yoke pin 174 includes a generally cylindrical center region 180 flanked by generally rectangular-shaped ends 184. Rectangular ends 184 slidably engage a pair of spaced apart correspondingly shaped slots 184 (see FIG. 10) formed in shift fork 72. The connection between yoke pin 174 and slots 184 in shift fork 74 operates to fixedly connect yoke bar 168 to shift fork 72 for concurrent movement in a first direction, while simultaneously allowing yoke bar 168 the freedom to move in a second direction relative to shift fork 74. The first direction is generally parallel to a longitudinal axis of shift rail 126, and the second direction is generally perpendicular to the first direction. Configuring the connection between yoke bar 168 and shift fork 72 in this manner may allow for more liberal tolerances, which may in turn reduce manufacturing costs.

Second end 172 of yoke bar 168 includes a notched region 186 that cooperatively interacts with first notched end 154 of neutral sensing plunger 152. With shift fork 72 positioned in a neutral position, as illustrated in FIG. 4, first notched end 154 of neutral sensing plunger 152 is biased into engagement with notched region 186 of yoke bar 168. Neutral sensor 164 detects that neutral sensing plunger 152 is arranged in the neutral position and proceeds to generate a signal indicating that main transmission section 12 is in neutral.

Displacing shift fork 74 to a first axial position, as shown in FIG. 6, causes yoke bar 168 to move axially within yoke bar bore 178, thus moving neutral sensing plunger 152 out of engagement with notched region 186 of yoke bar 168. This has the effect of displacing neutral sensing plunger 152 to the right, which in turn depresses neutral sensor plunger 166 of neutral sensor 164. Neutral sensor 164 detects that neutral sensing plunger 152 is arranged in a non-neutral position and generates a signal indicating that main transmission section 12 is not in neutral.

Displacing shift fork 72 to a second axial position, as shown in FIG. 7, causes yoke bar 168 to move axially within yoke bar bore 178, thus moving neutral sensing plunger 152 out of engagement with notched region 186 of yoke bar 168. This has the effect of displacing neutral sensing plunger 152 to the right within neutral sensing bore 150, which in turn depresses neutral sensor plunger 166 of neutral sensor 165. Neutral sensor 164 detects that neutral sensing plunger 152 is arranged in a non-neutral position, as evidenced by the depression of neutral sensor plunger 166, and generates a signal indicating that main transmission section 12 is not in neutral.

It will be appreciated that the exemplary transmission described herein has broad applications. For example, the sensor system of the present invention is equally applicable to transmissions having range, combined range/splitter or splitter/range type auxiliary sections. The foregoing configurations were chosen and described in order to illustrate principles of the methods and apparatuses as well as some practical applications. The preceding description enables others skilled in the art to utilize methods and apparatuses in various configurations and with various modifications as are suited to the particular use contemplated. In accordance with the provisions of the patent statutes, the principles and modes of operation of the disclosed transmission have been explained and illustrated in exemplary configurations.

It is intended that the scope of the present methods and apparatuses be defined by the following claims. However, it must be understood that the disclosed transmission may be practiced otherwise than is specifically explained and illustrated without departing from its spirit or scope. It should be understood by those skilled in the art that various alternatives to the configuration described herein may be employed in practicing the claims without departing from the spirit and scope as defined in the following claims. The scope of the disclosed transmission should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

What is claimed is:

1. A transmission clutch fork shift mechanism comprising:
a first shift rail;
a second shift rail;
a clutch fork slidably engaging the second shift rail;
a lever pivotably attached to a pivot pin, the lever including a first end attached to the first shift rail for concurrent movement therewith, and a second end attached to the clutch fork for concurrent movement therewith;
a yoke bar having a first end coupled to the clutch fork for concurrent movement therewith; and
a position sensor operably engaging the yoke bar, the position sensor operable for detecting a position of the yoke bar.

2. The mechanism of claim 1 further comprising:
an elongated bar;
a second shift fork fixedly attached to the elongated bar; and
a neutral sensor plunger operably engaging the yoke bar and the elongated bar, the neutral sensor plunger moveable between a first position and a second position in response to movement of the yoke bar and the elongated bar, the first position indicative that both the first and second clutch forks are arrange in a neutral position, and the second position indicative that at least one of the first and second clutch forks are arranged in a non-neutral position.

3. The mechanism of claim 1, wherein a longitudinal axis of the yoke bar is arranged substantially parallel to a longitudinal axis of the second shift rail.

4. The mechanism of claim 1, wherein the shift fork is moveable in response to movement of the first shift rail.

5. The mechanism of claim 4, wherein movement of the first shift rail in a first direction causes the shift fork to move in a second direction substantially opposite the first direction.

6. The mechanism of claim 1 further comprising a second shift fork attached to the second shift rail.

7. The mechanism of claim 1, wherein the yoke bar is pivotably connected to the shift fork.

8. The mechanism of claim 7, further comprising a pin attached to the yoke bar and slidably engaging at least one slot in the shift fork.

9. The mechanism of claim 7, further comprising a pin rotatably connected to the yoke bar and slidably engaging at least one slot in the shift fork.

10. The mechanism of claim 1, wherein the yoke bar is fixedly attached to the shift fork for concurrent movement therewith in a first direction, and slidably engages the shift fork to permit relative motion between the yoke bar and the shift fork in a second direction.

11. The mechanism of claim 10, wherein the first direction is substantially parallel to a longitudinal axis of the second shift rail.

12. The mechanism of claim 11, wherein the second direction is substantially perpendicular to the first direction.

13. The mechanism of claim 1 further comprising:
a second clutch fork fixedly attached to the second shift rail; and
a neutral sensor plunger operably engaging the yoke bar and the second shift rail, the neutral sensor plunger moveable between a first position and a second position in response to movement of the yoke bar and the second shift rail, the first position indicative that both the first and second clutch forks are arrange in a neutral position, and the second position indicative that at least one of the first and second clutch forks are arrange in a non-neutral position.

14. The mechanism of claim 1 further comprising:
a third shift rail;
a second shift fork fixedly attached to the third shift rail; and
a neutral sensor plunger operably engaging the yoke bar and the third shift rail, the neutral sensor plunger moveable between a first position and a second position in response to movement of the yoke bar and the third shift rail, the first position indicative that both the first and second clutch forks are arrange in a neutral position, and the second position indicative that at least one of the first and second clutch forks are arranged in a non-neutral position.

15. The mechanism of claim 1, wherein a longitudinal axis of the yoke bar is arranged substantially parallel to a longitudinal axis of the second shift rail.

16. The mechanism of claim 8, wherein at least one end of the pin includes a generally rectangular shaped end engaging the at least one slot in the shift fork.

17. The mechanism of claim 9, wherein at least one end of the pin includes a generally rectangular shaped end engaging the at least one slot in the shift fork.

* * * * *

UNITED STATES PATENT AND TRADEMARK OFFICE
CERTIFICATE OF CORRECTION

PATENT NO.         : 8,726,749 B2
APPLICATION NO.    : 13/244597
DATED              : May 20, 2014
INVENTOR(S)        : Mark A. Hirsch et al.

Page 1 of 1

It is certified that error appears in the above-identified patent and that said Letters Patent is hereby corrected as shown below:

In the Claims:

At column 9, claim number 2, line number 40, delete "arrange" and insert -- arranged --.

At column 10, claim number 13, line number 27, delete "arrange" and insert -- arranged --.

At column 10, claim number 13, line number 29, delete "arrange" and insert -- arranged --.

At column 10, claim number 14, line number 40, delete "arrange" and insert -- arranged --.

Signed and Sealed this
Twenty-second Day of July, 2014

Michelle K. Lee
*Deputy Director of the United States Patent and Trademark Office*